(12) United States Patent
Horie

(10) Patent No.: US 6,396,555 B1
(45) Date of Patent: May 28, 2002

(54) LCD PANEL IN WHICH THE SCANNING LINE AND THE LINE CONNECTED TO THE DRAIN OF THE TFT ARE PARALLEL

(75) Inventor: Yoshitaka Horie, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/359,356

(22) Filed: Jul. 21, 1999

(30) Foreign Application Priority Data

Jul. 24, 1998 (JP) .......................................... 10-210026

(51) Int. Cl.⁷ .......................................... G02F 1/1343
(52) U.S. Cl. ..................................................... 349/141
(58) Field of Search .......................... 349/141, 48, 139, 349/38, 39, 43

(56) References Cited

U.S. PATENT DOCUMENTS

| | | | | |
|---|---|---|---|---|
| 4,678,282 A | * | 7/1987 | Yaniv et al. | 350/334 |
| 5,892,562 A | * | 4/1999 | Yamazaki et al. | 349/141 |
| 6,038,007 A | * | 3/2000 | Watanabe et al. | 349/110 |
| 6,052,163 A | * | 4/2000 | Sung | 349/42 |
| 6,271,903 B1 | * | 8/2001 | Shin et al. | 349/110 |

FOREIGN PATENT DOCUMENTS

| JP | 7128687 | 5/1995 |
|---|---|---|
| JP | 7239480 | 9/1995 |
| JP | 9-15650 | 1/1997 |
| JP | 09-160073 | 6/1997 |
| JP | 9171194 | 6/1997 |
| JP | 9185080 | 7/1997 |
| JP | 9230380 | 9/1997 |
| JP | 1010494 | 1/1998 |
| JP | 1010570 | 1/1998 |

* cited by examiner

Primary Examiner—Toan Ton
Assistant Examiner—Andrew Schechter
(74) Attorney, Agent, or Firm—Young & Thompson

(57) ABSTRACT

A liquid crystal display panel is provided with a transparent substrate, a thin film transistor provided on the transparent substrate, and a pixel electrode provided on the transparent substrate. A scanning line connected to a gate of the thin film transistor is provided on the transparent substrate. A voltage which controls the thin film transistor is applied to the scanning line from an external circuit. An opposite electrode connected to a source of the thin film transistor is provided on the transparent substrate. A potential difference between the opposite electrode and the pixel electrode is a voltage applied to a liquid crystal. A common electrode line connected to a drain of the thin film transistor is provided on the transparent substrate. A voltage which controls the potential of the opposite electrode is applied to the common electrode line from the external circuit.

5 Claims, 4 Drawing Sheets

US 6,396,555 B1

LCD PANEL IN WHICH THE SCANNING LINE AND THE LINE CONNECTED TO THE DRAIN OF THE TFT ARE PARALLEL

BACKGROUND OF THE INVENTION

1. Field of the Invention

The present invention relates to a liquid crystal display panel used in a display device for OA (Office Automation) and the like and particularly, to a liquid crystal display panel with high luminance.

2. Description of the Related Art

A liquid crystal display panel of an active matrix type is the main stream of liquid crystal display panel. In an active matrix liquid crystal display panel, a liquid crystal is contained between two transparent substrates which are disposed in parallel to each other and display is controlled by applying voltage to the liquid crystal in a direction perpendicular to the transparent substrates. In a liquid crystal display panel of this voltage application type, however, there arises a drawback that a contrast of display is strongly affected according to a viewing angle.

Therefore, in recent years, a liquid crystal display panel of an IPS type, in which a change in contrast according to a viewing angle is diminished and wide viewing angle characteristics can be achieved by applying voltage to transparent substrates in parallel thereto, has been developing toward commercialization.

In a liquid crystal display panel of the IPS type, however, display is affected by electric fields occurring due to a potential change of a signal line after writing to a pixel and a potential change of an adjacent signal line.

Therefore, in order to prevent such an influence on display from occurring, there has been disclosed a liquid crystal display panel in which a common electrode line having a width equal to or more than a predetermined value is interposed between a signal line and a pixel adjacent to each other (see Japanese Patent Application Laid-Open No. Hei 9-15650). FIG. 1 is a schematic view showing a conventional liquid crystal display panel.

In the conventional liquid crystal display panel of the IPS type, a plurality of signal lines 54 and a plurality of scanning lines 55 intersected with each other are provided. A region which is surrounded by adjacent signal lines 54 and adjacent scanning lines 55 is a display section 57 of a fundamental pixel unit. Further, a pixel electrode 52 extending in the same direction as that of a signal line 54 is disposed in a central portion of the display section 57. A thin film field effect transistor 51 whose gate is connected to the scanning line 55 is provided. The drain of the thin film transistor 51 is connected to the signal line 54 and the source thereof is connected to a pixel electrode 52.

In addition, a common electrode line 56 extending in the same direction as that of the scanning line 55 is provided between the pixel electrode 52 and the scanning line 55 to which the thin film transistor 51 of the fundamental pixel unit is not provided. Further, opposite electrodes 53 extending in the same direction as that of the signal line 54 are provided between the pixel electrode 52 and both of the two signal lines 54 in the fundamental pixel unit. The opposite electrodes 53 are connected to the common electrode line 56.

In the mean time, these elements such as the thin film transistor 51 described above are disposed on one of the two transparent substrates.

With the conventional liquid crystal display panel thus constructed, a cross talk is alleviated, and a good image quality and a wide viewing angle are achievable.

However, since the common electrode 56 is provided on such a conventional liquid crystal display panel as described above, an effective region (opening section) where display is actually effected is narrow compared with a twisted nematic (TN) type. Therefore, the conventional liquid crystal display panel has a problem that high luminance is hard to be realized.

SUMMARY OF THE INVENTION

Accordingly, it is an object of the present invention to provide a liquid crystal display panel by which high luminance is achievable while securing a wide viewing angle.

According to one aspect of the present invention, a liquid crystal display panel may comprise a transparent substrate, a thin film transistor provided on the transparent substrate, and a pixel electrode provided on the transparent substrate. A scanning line connected to a gate of the thin film transistor may be provided on the transparent substrate. A voltage which controls the thin film transistor may be applied to the scanning line from an external circuit. An opposite electrode connected to a source of the thin film transistor may be provided on the transparent substrate. A potential difference between the opposite electrode and the pixel electrode may be a voltage applied to a liquid crystal. A common electrode line connected to a drain of the thin film transistor may be provided on the transparent substrate. A voltage which controls a potential of the opposite electrode is applied to the common electrode line from the external circuit.

According to one aspect of the present invention, when the thin film transistor is made to assume the OFF state by a voltage applied to the scanning line, the opposite electrode assumes an electrically open state. Therefore, a voltage between a pixel electrode and the opposite electrode is held constant until the thin film transistor assumes the ON state in the next stage even if the potential of the pixel electrode changes. Hence, wiring that has conventionally been used to eliminate influence of electric field is unnecessary, which enables an opening section to be widely secured. Thereby, high luminance can be assured.

The pixel electrode and the opposite electrode preferably have regions respectively which are superimposed on each other in a thickness direction of the transparent substrate.

Further, the common electrode line is shared by adjacent pixels and interposed between the adjacent pixels.

Besides, the liquid crystal display panel may include a signal line connected to the pixel electrode. The opposite electrode may be surrounded by the common electrode line, the pixel electrode and the signal line.

In addition, the common electrode line and the scanning line may be substantially arranged in parallel to each other. The common electrode line and the signal line may substantially perpendicularly intersect with each other.

According to the present invention, since an influence which electric field exerts on a display can be eliminated even if there is provided no wiring which has been understood to be necessary in the prior art, the wiring is unnecessary. Hence, a wide opening section can be secured, thereby enabling high luminance to be achieved while securing a wide viewing angle.

PREFERRED EMBODIMENTS OF THE INVENTION

Figure 1:
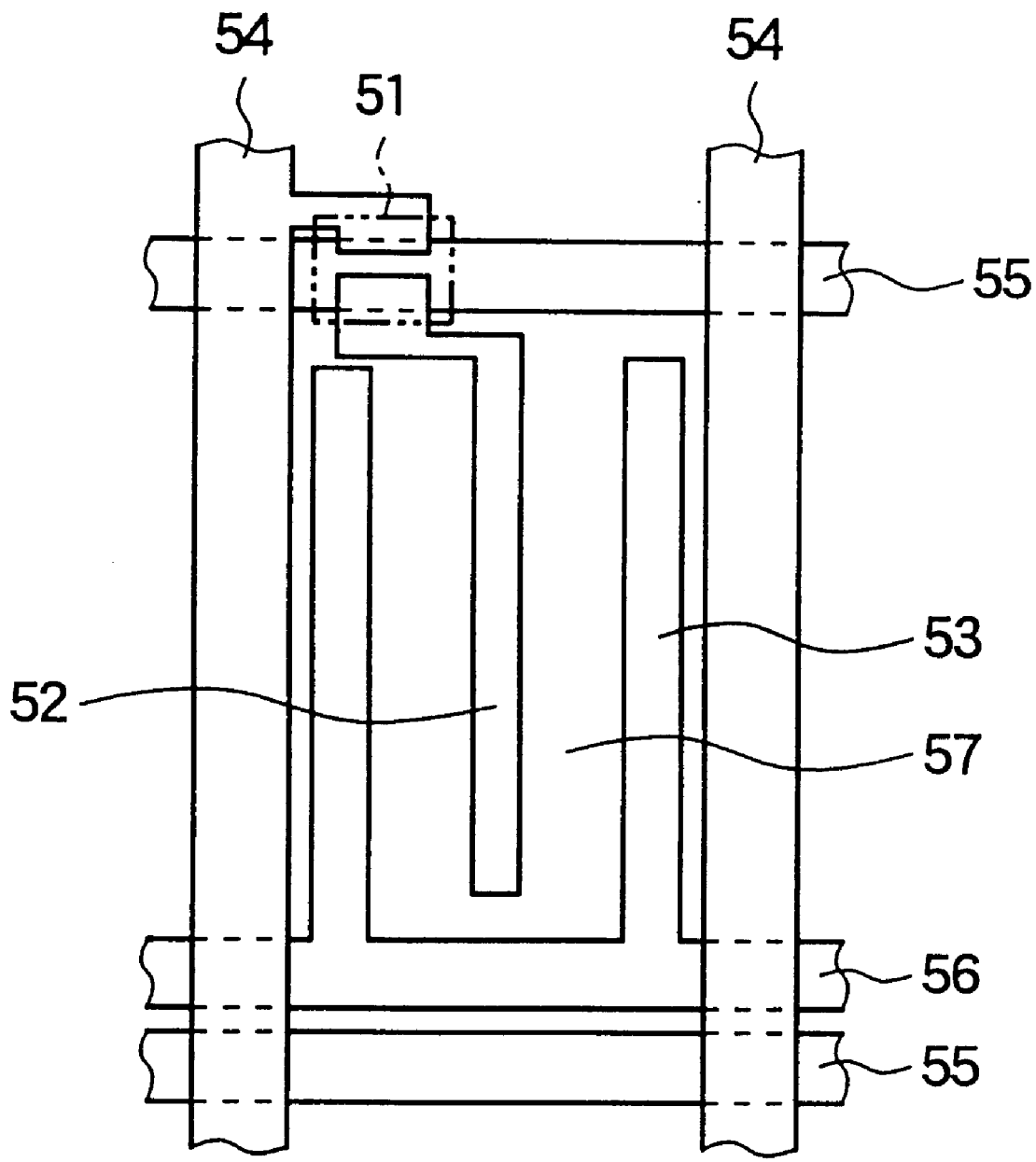
FIG. 1 is a schematic view showing a conventional liquid crystal a is play panel.
Figure 2:
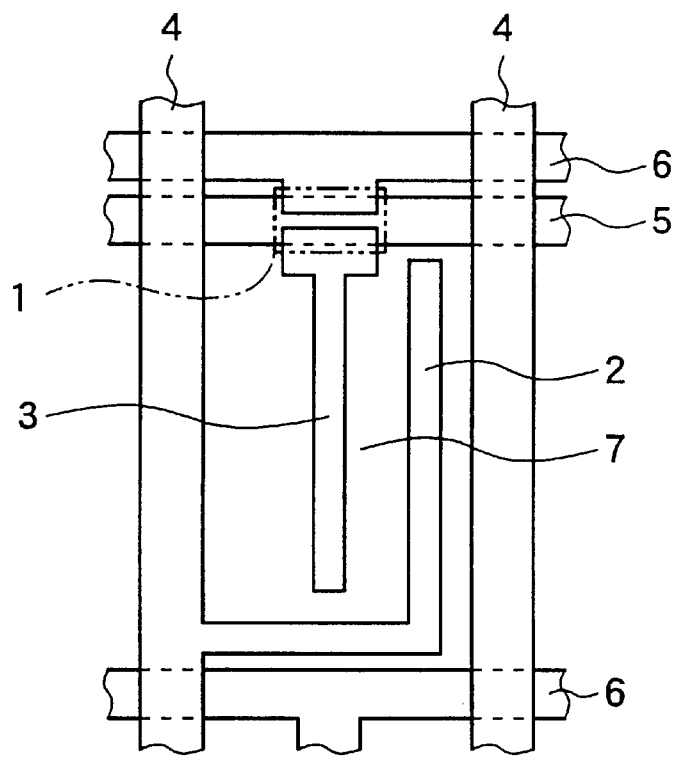
FIG. 2 is a schematic view showing a structure of a liquid crystal display panel according a first embodiment of the present invention.
Figure 3:
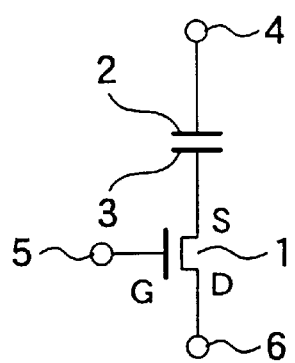
FIG. 3 is a circuit diagram showing an equivalent circuit of a fundamental pixel unit in the first embodiment.

Liquid crystal display panels according to embodiments of the present invention will below be described with reference to the accompanying drawings in detail. FIG. 2 is a schematic view showing a structure of a liquid crystal display panel according to a first embodiment of the present invention. FIG. 3 is a circuit diagram showing an equivalent circuit of a fundamental pixel unit in the first embodiment.

A liquid crystal display panel of the embodiment includes two transparent substrates (not shown) having a pair of sheet polarizers and a liquid crystal layer (not shown) sandwiched by the substrates.

Further, a plurality of signal lines 4 and a plurality of common electrode lines 6 are disposed on a surface on the liquid crystal layer side of one of the two transparent substrates. The signal lines 4 and the common electrode lines 6 are preferably intersected with each other perpendicularly. A region surrounded by adjacent signal lines 4 and adjacent common electrode lines 6 is a display section 7 of a fundamental pixel unit. An opposite electrode 3 preferably extending in the same direction as the signal lines 4 is provided in a central portion of the display section 7.

A scanning line 5 is arranged in the vicinity of one of the common electrode lines 6 of the display section 7. A thin film field effect transistor (TFT) 1 whose gate connected to the scanning line 5 is provided on the transparent substrate. The drain of the thin film transistor 1 is connected to the common electrode line 6 and the source thereof is connected to the opposite electrode 3. Besides, between the opposite electrode 3 and one of the two signal lines 4, there is provided a pixel electrode 2 which is connected to the other of the two signal lines 4 and extends in the same direction as that of the signal lines 4. The opposite electrode 3 is surrounded by the common electrode lines 6, the pixel electrode 2 and the other signal lines 4.

The fundamental pixel unit thus constructed in such a manner, for example, is repeatedly formed on the one of the two transparent substrates. Further, an external circuit (not shown) which applies voltages, while controlling, to the signal lines 4, the scanning line 5 and the common electrode line 6 is provided outside the panel.

A voltage applied to the scanning line 5 is controlled by the external circuit so that an ON voltage is applied when a pixel is selected. That is, a voltage which switches the thin film transistor 1 between an ON state and an OFF state is applied to the scanning line 5. Thereby, one of a writing state and a holding state of each pixel is selected according to a potential of the scanning line 5.

A voltage applied to the common electrode 6 is a voltage which controls a potential of the opposite electrode 3 and constant regardless of a pixel and a display condition. A constant potential is applied in the same period as a period in which an ON voltage is applied to the scanning line 5 and control is effected by the external circuit so that a relationship in potential between the scanning line 5 and the common electrode line 6 is reversed for each scanning line 5.

A voltage applied to the signal line 4 is controlled by the external circuit, according to a picture displayed on a screen, so that a voltage which is computed from a relationship between an applied voltage and a transmittance in advance is applied to the signal line 4 in a timed manner to application of a voltage to the scanning line 5 for each pixel. A voltage is applied to the liquid crystal layer of the fundamental pixel unit by a potential difference between a pair of the pixel electrode 2 and the opposite electrode 3.

Figure 4:
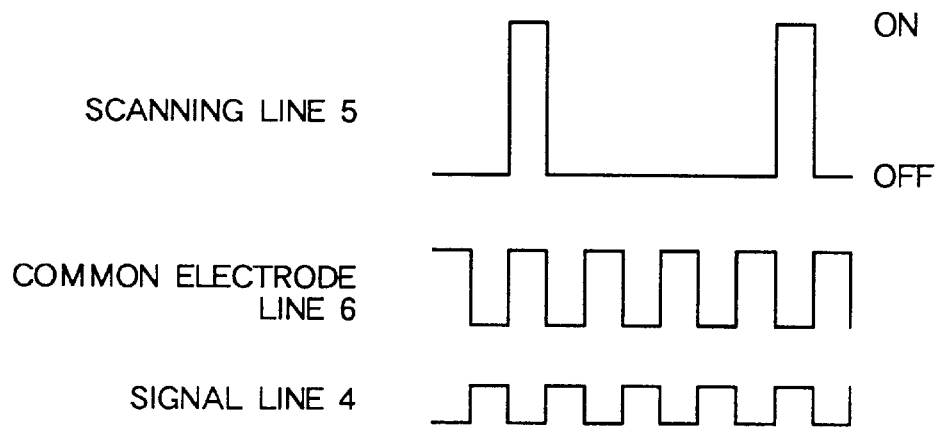
FIG. 4 is a timing chart showing operation of the liquid crystal display panel according to the first embodiment.

Next, operation of a liquid crystal display panel constructed in such a manner will be described. FIG. 4 is a timing chart showing operation of the liquid crystal display panel according to the first embodiment of the present invention.

As shown in FIG. 4, when a potential of the scanning line 5 assumes an ON potential, the thin film transistor 1 also assumes the ON state and a potential of the common electrode line 6 is supplied to the opposite electrode 3. Therefore, a potential difference between the common electrode line 6 and the signal line 4 is a voltage applied to the liquid crystal portion.

Then, when a potential of the scanning line 5 assumes an OFF potential, the thin film transistor 1 assumes the OFF state, the opposite electrode 3 and the common electrode line 6 are disconnected from each other. Thus, the opposite electrode 3 enters the electrically open state. Accordingly, a voltage between the pixel electrode 2 and the opposite electrode 3 is held constant until the scanning line 5 is applied with the ON potential in the next stage even if a potential of the signal line 4 changes.

In such a manner, in the embodiment, since a potential of the pixel electrode 2 is always equal to a potential of the signal line 4 in a voltage holding state, no wiring to prevent a change in potential of the signal line 4 from influencing a display is necessary. Therefore, it is possible to use an area, which the wiring has conventionally occupied in, as a display region, thereby enabling a wide opening area to be secured. Further, since the signal line 4 is used as an pixel electrode 2, an area occupied by wiring is reduced as compared with conventional and thereby a region corresponding to unnecessary wiring can also be used as an opening section. Therefore, high luminance can actually be realized.

Figure 5:
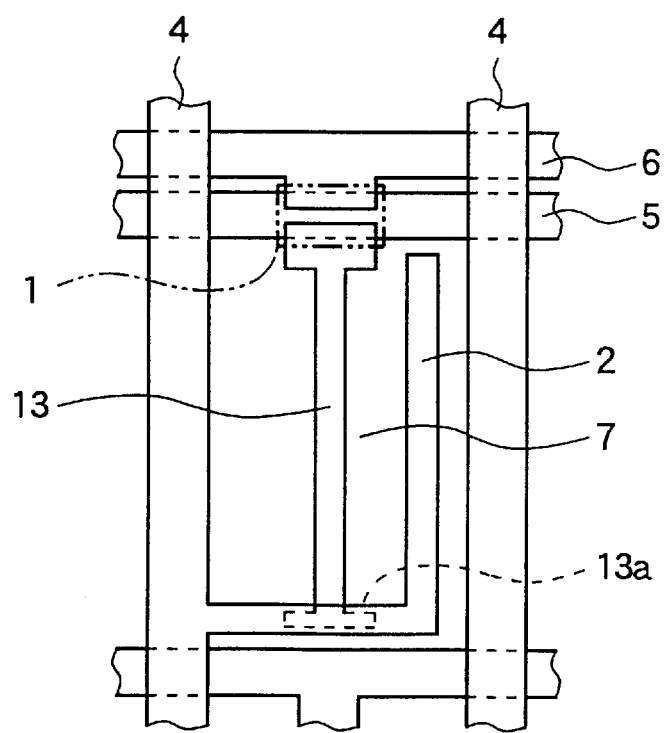
FIG. 5 is a schematic view showing a structure of a liquid crystal display panel according to a second embodiment of the present invention.
Figure 6:
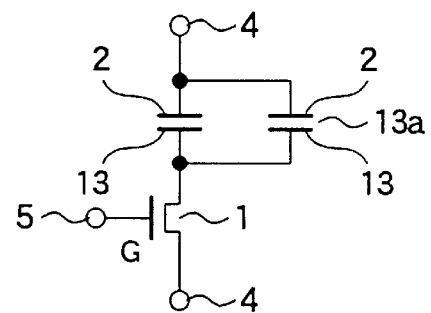
FIG. 6 is a circuit diagram showing an equivalent circuit of a fundamental pixel unit in the second embodiment.

Then, a second embodiment of the present invention will be described. In the embodiment, an auxiliary capacitor is provided between an opposite electrode and a pixel electrode. FIG. 5 is a schematic view showing a structure of a liquid crystal display panel according to the second embodiment of the present invention. FIG. 6 is a circuit diagram showing an equivalent circuit of a fundamental pixel unit of the second embodiment. Incidentally, in the second embodiment shown in FIGS. 5 and 6, the same components as those of the first embodiment shown in FIGS. 2 and 3 are indicated by the same reference numerals and detailed descriptions on them will be omitted.

In the embodiment, similar to the first embodiment, an opposite electrode 13 preferably extending in the same direction as that of the signal line 4 is arranged in a central portion of the display section 7. The opposite electrode 13 has a region which is superimposed on a portion of the pixel electrode 2 which the portion is parallel to a common electrode 6. Thus, an auxiliary capacitor 13a, which has the portion of the pixel electrode 2 and the portion of the opposite electrode 13 as two electrodes, is formed with the superimposed region.

Therefore, in the embodiment, since a potential of the opposite electrode 13 relative to the pixel electrode 2 is held in a more secured manner, image quality is increased.

Figure 7:
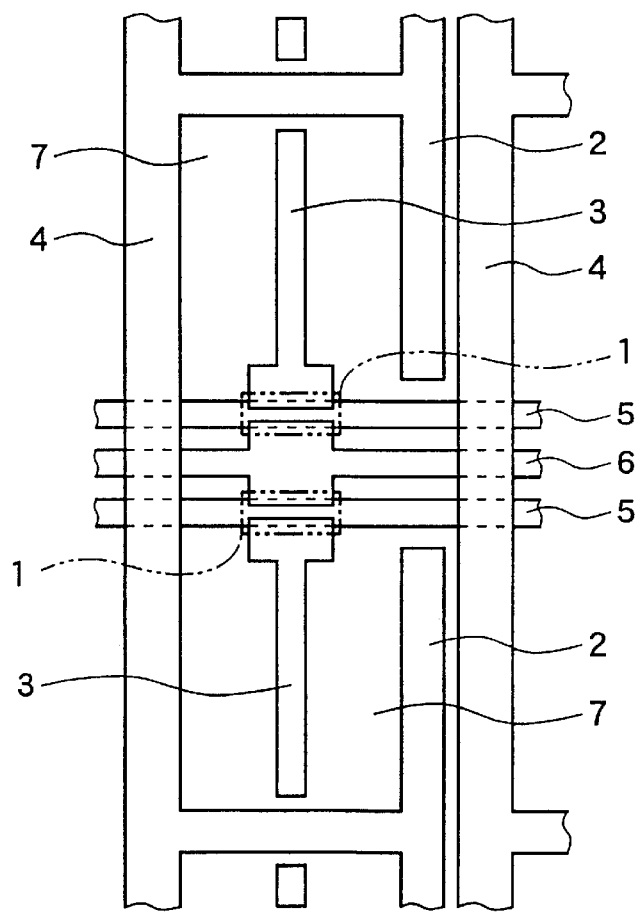
FIG. 7 is a schematic view showing a structure of a liquid crystal display panel according to a third embodiment of the present invention.

Then, a third embodiment of the present invention will be described. In the embodiment, a common electrode line to which a thin film transistor is provided is shared by two fundamental pixel units and a new fundamental unit constructed from the two fundamental pixel units is repeatedly formed on one of two transparent substrates. FIG. 7 is a schematic view showing a structure of a liquid crystal display panel according to the third embodiment of the present invention. Incidentally, in the third embodiment shown in FIG. 7, the same components as those in the first embodiment as shown in FIG. 2 are indicated by the same reference numerals and detailed descriptions on them are omitted.

In the third embodiment, each fundamental pixel unit may be constructed in a similar manner to the first embodiment. However, the common electrode 6 to which the thin film transistor 1 is provided is shared by two fundamental pixel units and the two fundamental pixel units are preferably arranged in axial symmetry with respect to the common electrode line 6. The other common electrode line 6, which is provided in the first embodiment, is not provided in the third embodiment. In addition, a part of a pixel electrode 2 parallel to the common electrode line 6 is also shared by the two fundamental pixel units adjacent to each other in the direction along which the signal line 4 extends. A new fundamental unit is constructed from the two fundamental pixel units adjacent to each other in the direction along which the signal line 4 extends and the new fundamental unit is repeatedly formed on one of two transparent substrates.

Accordingly, in the third embodiment, since parts of the common electrode line 6 and the pixel electrode 2 are shared by adjacent fundamental pixel units, an effective area of a display section 7 is further expanded.

Incidentally, the third embodiment can be applied to the second embodiment.

The order in which elements such as a scanning line and a pixel electrode are stacked on a transparent substrate is not restricted to the orders shown in FIGS. 2, 5 and 7. For example, a common electrode line can be arranged in a layer above a signal line.

What is claimed is:

1. A liquid crystal display panel comprising:

a transparent substrate;

a thin film transistor on said transparent substrate;

a pixel electrode on said transparent substrate;

a scanning line on said transparent substrate and connected to a gate of said thin film transistor, a voltage which controls said thin film transistor being applied to said scanning line from an external circuit;

an opposite electrode on said transparent substrate and connected to a source of said thin film transistor, a potential difference between said opposite electrode and said pixel electrode being a voltage applied to a liquid crystal; and a common electrode line on said transparent substrate and connected to a drain of said thin film transistor, a voltage which controls a potential of said opposite electrode being applied to said common electrode line from said external circuit, said pixel electrode and said opposite electrode having regions respectively which are superimposed on each other in a thickness direction of said transparent substrate, said common electrode line and said scanning line being substantially parallel to each other.

2. The liquid crystal display panel according to claim 1, wherein said common electrode line is shared by adjacent pixels and interposed between said adjacent pixels.

3. The liquid crystal display panel according to claim 1, further comprising a signal line connected to said pixel electrode, said opposite electrode being surrounded by said common electrode line, said pixel electrode and said signal line.

4. The liquid crystal display panel according to claim 3, wherein said common electrode line and said signal line substantially perpendicularly intersect.

5. A liquid crystal display panel comprising:

a transparent substrate;

a thin film transistor on said transparent substrate;

a pixel electrode on said transparent substrate;

a signal line connected to said pixel electrode;

a scanning line on said transparent substrate and connected to a gate of said thin film transistor, a voltage which controls said thin film transistor being applied to said scanning line from an external circuit;

an opposite electrode on said transparent substrate and connected to a source of said thin film transistor, a potential difference between said opposite electrode and said pixel electrode being a voltage applied to a liquid crystal; and a common electrode line on said transparent substrate and connected to a drain of said thin film transistor, a voltage which controls a potential of said opposite electrode being applied to said common electrode line from said external circuit, said common electrode line and said scanning line are substantially parallel to each other, said common electrode line and said signal lines substantially perpendicularly intersect.

* * * * *